B. DYSART.
ADDING AND LISTING MACHINE.
APPLICATION FILED SEPT. 10, 1917.

1,278,614.

Patented Sept. 10, 1918.
3 SHEETS—SHEET 1.

Attest
Charles A. Becker

Inventor:
Birney Dysart,
by Rippey & Kingsland
His Attorneys.

B. DYSART.
ADDING AND LISTING MACHINE.
APPLICATION FILED SEPT. 10, 1917.

1,278,614.

Patented Sept. 10, 1918.
3 SHEETS—SHEET 2.

Attest.
Charles A. Becker

Inventor.
Birney Dysart,
by Rippey & Kingsland
His Attorneys.

B. DYSART.
ADDING AND LISTING MACHINE.
APPLICATION FILED SEPT. 10, 1917.
1,278,614.
Patented Sept. 10, 1918.
3 SHEETS—SHEET 3.
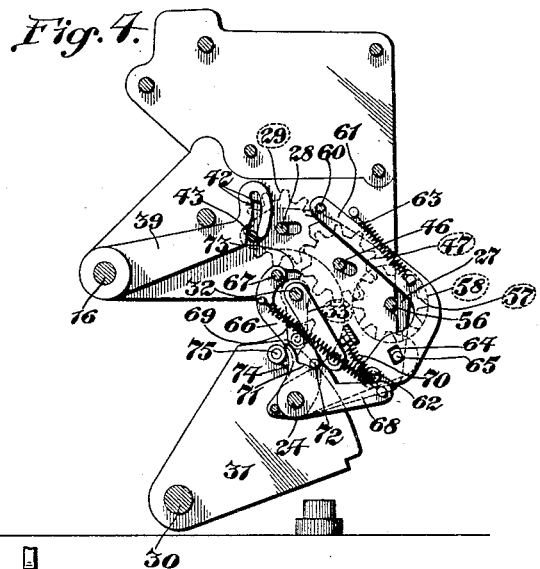
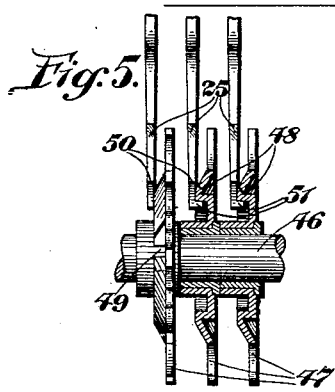
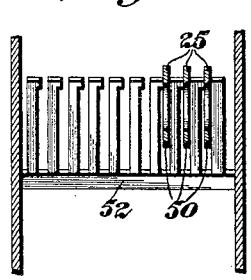
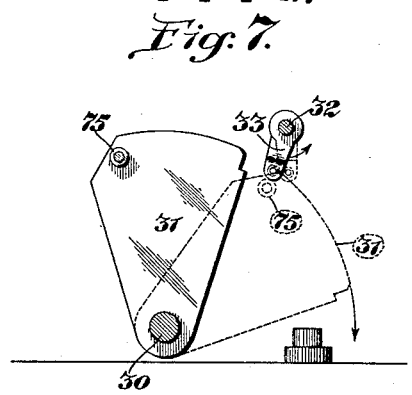
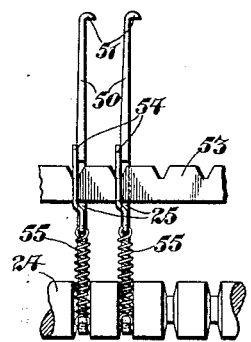
Attest.
Charles A. Becker.
Inventor:
Birney Dysart,
by Rippey & Kingsland
His Attorneys.

UNITED STATES PATENT OFFICE.

BIRNEY DYSART, OF CINCINNATI, OHIO.

ADDING AND LISTING MACHINE.

1,278,614. Specification of Letters Patent. Patented Sept. 10, 1918.

Application filed September 10, 1917. Serial No. 190,532.

*To all whom it may concern:*

Be it known that I, BIRNEY DYSART, a citizen of the United States, residing at the city of Cincinnati, county of Hamilton, and State of Ohio, have invented a new and useful Adding and Listing Machine, of which the following is a specification.

This invention relates to adding and listing machines.

The invention has particular reference to that class of adding and listing machines containing a differential mechanism in which the items or numbers are set up or registered before being listed or added, and which employ a series of type-carriers controlling an adding mechanism, and means for operating the type-carriers in recording and adding operations to cause the adding mechanism to add the items or numbers.

Some of the adding machines of the class mentioned have the adding mechanism located within the body of the machine out of view of the operator, so that the operator is not constantly informed of the total or amount contained or represented in the adding mechanism. The Dalton adding machine now on the market which embodies substantially the adding and listing mechanism disclosed in Hubert Hopkins Patent No. 1,039,130, dated September 24, 1912, is such an adding and listing machine in which adding mechanism is practically invisible. My present invention having specific reference to a machine of that type, though its adaptability for use is not limited to that specific machine, for convenience of illustration and description I have illustrated my invention embodied in a machine containing substantially the differential mechanism of the Dalton adding machine.

An object of the invention is to provide such a machine with mechanism whereby in the idle or normal position of the operating parts the sum or total of any amounts that may have been added by the machine will be displayed in view of the operator at a point between the key board and the position on the platen where the printing is done. In the present instance the display of the sum or total of the amounts is rearward of the key board and at a slight angular distance from the point on the platen at which the printing is performed.

I am aware that it is not new in the construction of adding machines to display the total that has been accumulated in the machine at a point to the rear of the key board. Such a result has usually been attained by type-carriers which operate in a substantially vertical direction, the adding mechanism being operated by forwardly extending connections from the type-carriers.

In machines of the class to which this invention specially relates the construction is such as to necessitate the location of the adding pinions in a concealed position within the machine, so that even if the pinions had been provided with the usual dials carrying figures they could not have been seen by the operator, and the sum or total of the numbers that had been added in the machine could only be ascertained by printing the total.

I know of no adding machines having been placed upon the market which display the totals at a point rearward of the key board and which also afford the advantages resulting from pivotally mounted type-carriers for attaining visible printing in coöperation with a platen located within the arcs of the type-carriers.

A further object of the invention is to produce an adding and listing machine having a plurality of trains of parts for positioning type as required for printing and for actuating the adding pinions to add the numbers printed, the said trains of parts being individually removable from the machine without disturbing the remaining trains, the parts composing a train when so removed being freely separable, and in which machine the mounting of a member of a train in its operative position in the machine serves to hold the remaining members thereof securely in their positions in the machine.

A specific object of the invention is to provide means adapted to be embodied in a machine of the type of the Dalton adding machine mentioned, whereby the totals of the numbers added will be displayed whenever the operating shaft of the machine is in its idle or unoperated position.

An additional object is to provide an improved design or type of adding mechanism for adding machines of the Dalton type in which the members which aline the adding racks in idle position and which coöperate with the projections on the adding pinions to permit transferring from lower to higher orders, are substantially balanced in their bearings, thereby eliminating gravity as a factor in their movement from non-carrying to carrying position. In such machine the actuators for the adding pinions are in the form of arcuate racks or sectors and in embodying my invention in the Dalton adding machine the modifications I have made in its structure relate to the adding section and to the actuators thereof.

In the drawings,

Fig. 4 is a view illustrating details of the adding and transferring mechanism.

Fig. 5 is a view illustrating the locking connection between the latches, included in the transferring mechanism and the locking pinions by which said latches are normally retained in latching position.

Fig. 6 is a detailed view of a comb plate by which the latches are guided.

Fig. 7 is a view illustrating the means for rocking the shaft by which movement of the adding pinions into and out of mesh with their actuating racks is controlled.

Fig. 8 is a view illustrating the spring control slips which coöperate with the latches of the transferring mechanism.

Figure 1:
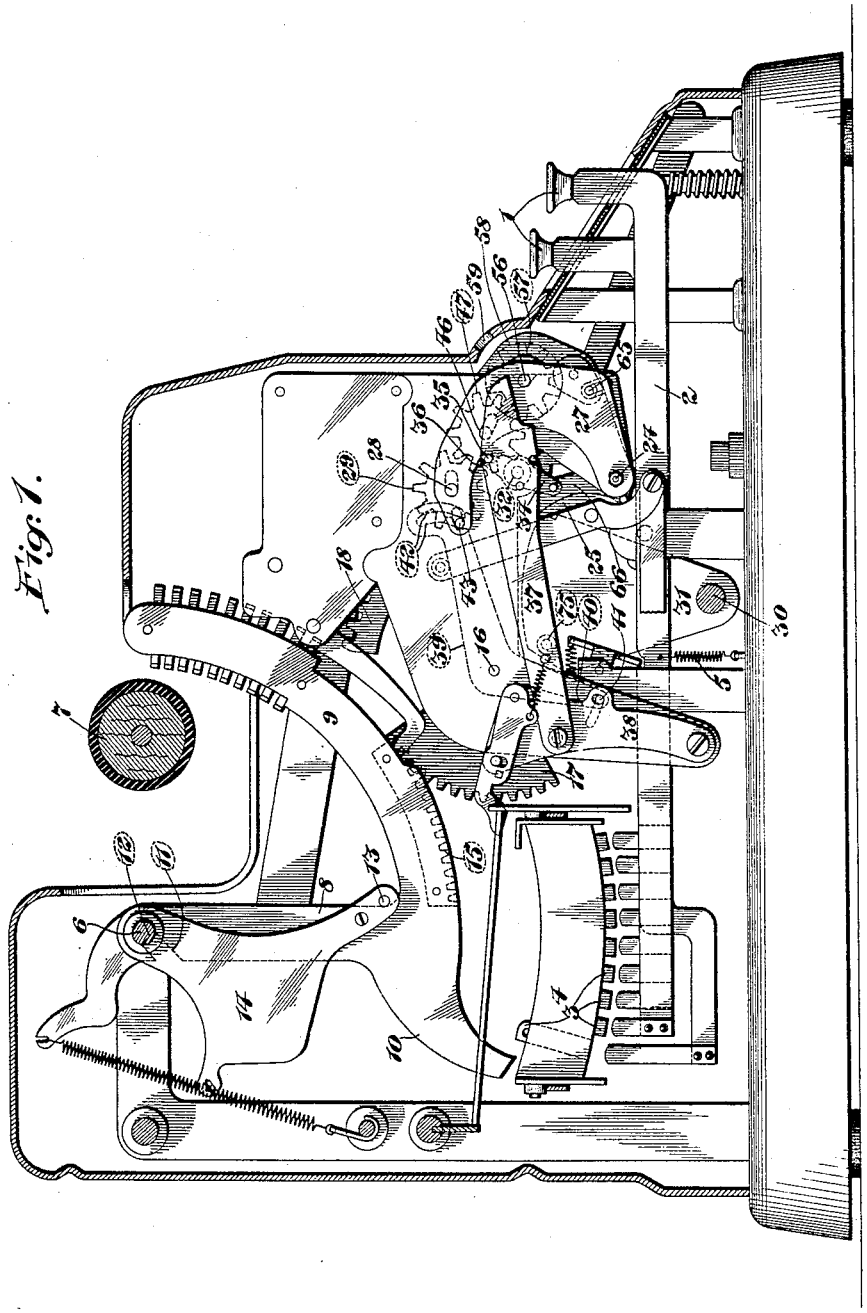
Figure 1 is a vertical sectional view of a machine of the Dalton type having my invention embodied therein.

The machine in which the invention is illustrated includes a series of numeral keys 1 disposed in convenient arrangement in a key board attached to the up-turned ends of the pivoted key levers 2. In the Dalton adding machine there are ten numeral keys attached to an equal number of key levers. The key levers 2 are operable to set differential stops 3 mounted in a movable carriage 4 so that by successive operations of the proper numeral keys the corresponding stops will be set in their proper numerical orders to coöperate with the later movement of the type-carriers when the same are moved toward recording positions. Each key lever is provided with a spring 5 by which it is immediately returned to its normal or idle position after having been operated to set a corresponding stop in the differential mechanism. Thus the key board is cleared at all times except when some one of the keys is held in depressed position by the finger of the operator. In the respect that there are ten numeral keys and differential stops mounted in a movable carriage, the machine illustrated and the Dalton adding machine conforms substantially to the adding and listing mechanism constituting a part of the subject-matter of the Hubert Hopkins Patent No. 1,039,130, mentioned.

The machine illustrated also resembles the Dalton adding machine and the machine of the Hopkins patent referred to, in the employment of a shaft 6 upon which the type-carriers and the actuators of the adding mechanism are pivotally supported. A further resemblance consists in the employment of a platen 7 which is located within the arcs of the arcuate type-carriers so that the platen is mounted between the shafts 6 and the type carried by the type-carriers which are supported by the shaft 6, thus enabling the records to be made upon the forward side of the platen so that they will be visible to the operator immediately after they are produced and the type-carriers have returned to their starting point. The mechanism for coöperating with the type to effect printing includes the usual hammers and the automatic mechanism for controlling them to drive the type toward the platen after the type-carriers have stopped in printing positions. The hammer mechanism referred to is well known in the Dalton adding machine and conforms substantially to the hammer mechanism disclosed in the Hopkins patent to which reference has been made, so that illustration and description thereof herein is unnecessary.

The type-carriers and their associated parts for operating the adding mechanism as well as the adding mechanism itself have been modified in order to permit my invention to be incorporated as an integral part of a machine including the above described mechanism.

As illustrated each of the type-carriers includes a vertical part 8, an arcuate part 9 and a downward extension 10. The vertical part 8 includes an oblique slot 11 near its upper end opening into a round hole which receives the shaft 6. The shaft 6 is provided with circumferential milled grooves in which the type-carriers are mounted and retained in their proper spaced adjustments. Each of the milled bearing portions of the shaft 6 is provided with a flat surface 12 on one side, thus making each bearing portion substantially D-shaped in cross section so that after the type-carriers are mounted on the shaft they are securely prevented from detachment due to the slot 11 being narrower than the greater diameter of the shaft. The flat portion of the shaft will permit the type-carriers to be individually mounted or removed when the rod 13 of the usual restoring bail is removed and the type-carrier is rotated a sufficient distance to bring the slot 11 to position in which the flat face 12 of the shaft bears against one of the walls of the slot. Removal of any type-carrier also permits its entrained connections of the adding mechanism to be easily removed without disturbing or loosening any of the remaining portions of the adding or listing mechanism, all of which will be retained in their proper operating positions in the machine, and capable of operation to perform their usual functions. The shaft, as usual, is arranged to rock in its bearings in the frames of the machine, and is rocked by operation of the type-carrier restoring bail comprising the arms 14 and the rod 13.

The projections 10 of the type-carriers are arranged to contact with the digit stops 3 of the differential mechanism which have been set by operation of the keys in order to stop the type-carriers in position to aline at the printing line the type required for printing the numbers. Each type-carrier has secured thereto an arcuate rack 15 which constitutes an actuator whereby each type-carrier will control the corresponding train of adding mechanism.

Figure 2:
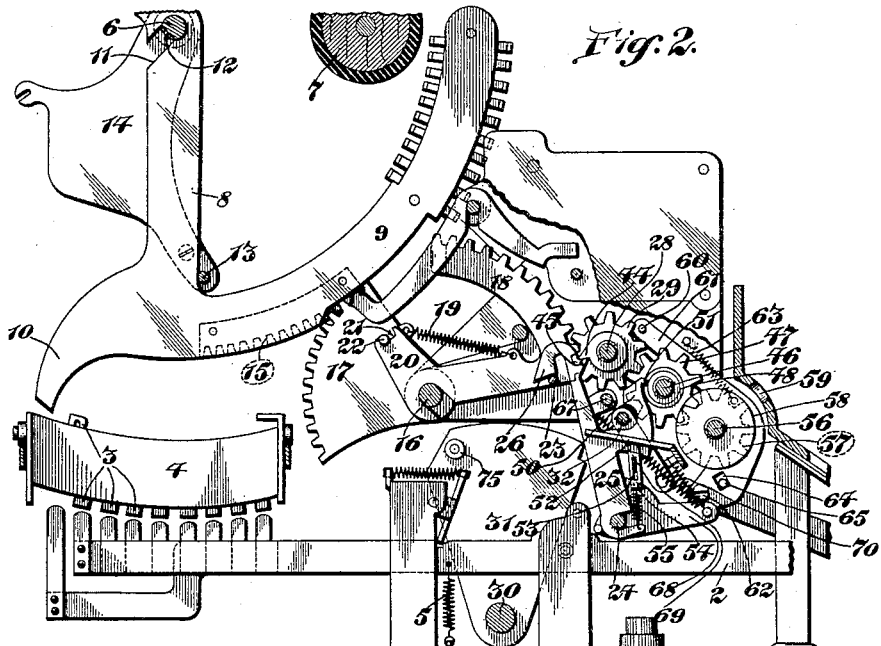
Fig. 2 is a vertical sectional view through the adding and listing mechanism of the machine illustrating the parts in idle or cleared position.

Upon a rock shaft 16 are mounted a series of gear segments or racks 17 meshing with the racks 15 attached to the type-carriers. For each of the racks 17 there is also mounted on the shaft 16 an arcuate rack 18. The racks 18 are controlled in their operations by the racks 17 and are for the purpose of actuating the adding pinions. In the embodiment illustrated the shaft 16 is formed with circumferential grooves in which the racks 17 and 18 are pivotally mounted and are held in proper spaced relation by the operation of the shaft separating the grooves. A spring 19 of the retractile type connects each of the racks 17 with its coöperating rack 18, the tendency of said springs being to actuate the racks 17 forwardly and the racks 18 rearwardly. Each of the racks 18 has an arm 20 extending along side of the coöperating rack 17 and provided in its end with a notch 21 in which a pin 22 of the rack 17 extends. The notch 21 is of sufficient width to permit a certain independent movement of the rack 18 relative to its coöperating rack 17, and this movement is sufficient to enable the racks 18 to have movement for actuating the adding pinions in transferring operations. In the form illustrated the independent movement of the racks 18 relative to the racks 17 is equivalent to the distance of one tooth of the former, since for convenience the adding pinions are illustrated as containing ten teeth, thus necessitating a movement of one tooth of each adding pinion when actuated in a transferring operation. Of course, this proportion may be varied to conform to the requirement and construction of different machines. The racks 17 and 18 are provided with slotted bearings for receiving the shaft 16 as will be understood by reference to Fig. 2 so that when any one of the type carriers is removed from the machine the corresponding racks 17 and 18 may also be removed.

The ordinary adding pinions and transfer mechanism shown and described in the Hubert Hopkins patent before mentioned and as used in the Dalton adding machine on the market may, with such obvious modifications as would readily suggest themselves to a mechanic skilled in the art, be employed in connection with the structures of my invention heretofore described. In like manner, various other well known forms of adding pinions and transfer mechanism may be similarly adapted and used without departing from the scope of my invention. In the present embodiment of the invention, however, I have employed an adding and transferring mechanism having novel features, which mechanism I will now describe.

Each rack 18 is provided near its forward end with a projection 23. A shaft 24 supports a series of pivoted elements 25 constituting a part of the transferring mechanism and herein referred to as carrying pawls. The upper end of each carrying pawl is formed with a downwardly extending widening hook 26 with which the projections 23 respectively coöperate. When the racks 18 are in their normal positions the projections 23 engage or abut against the lower ends of the hooks 26, but when any one of the racks 18 is operated in a transferring movement the projection 23 of that rack passes into the slot between the hook 26 and the member supporting it, thus actuating the corresponding adding pinion the distance necessary to effect transferring thereto from the next lower numerical order.

Two arms 27 are pivoted upon the shaft 24 and near their upper extremities support a shaft 28. A series of adding pinions 29 are mounted upon the shaft 28 for differential rotation by the racks 18 and are movable into and out of mesh with the racks 18. The arms 27 and the several shafts supported thereby, including the shaft 28 and others to which reference is hereinafter made, constitute a swinging frame for moving the pinions 29 transversely of their axes into and out of engagement with the locking device for said pinions. The operating mechanism for controlling the frame by which the adding pinions are engaged with and disengaged from the actuating rack 18 comprises connections operating automatically to disengage the pinions from the racks prior to forward movement of the type-carriers when the machine is operated to print an item or number, and also operating automatically to engage the pinions with the racks just prior to return movement by the type-carriers after the item or number has been printed, and it is appropriate to describe these connections at this point.

Figure 3:
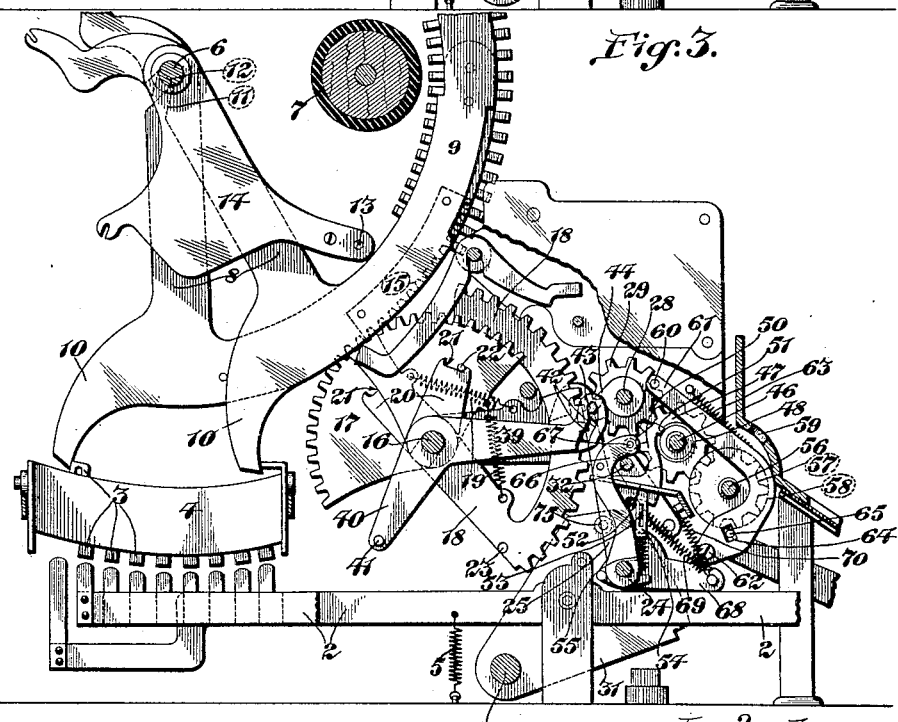
Fig. 3 is a similar sectional view illustrating the position of the parts when the type-carriers are in position for printing.

The machine illustrated includes a main shaft 30 which, in this instance, is a rock shaft and is equipped with a segmental arm 31. A small rock shaft 32 has on one end a depending arm or lever 33 which is swung forwardly by the segmental arm 31 when the rock shaft 30 is turned forwardly in order to permit movement of the type-carriers to recording position. In its forward movement the segmental arm 31 passes beyond the end of the arm or lever 33 so that on the return movement of the arm 31 toward its starting point the arm 33 will be moved in the opposite direction. Thus the shaft 32 is turned in one direction by forward movement of the arm 31 and is turned in the opposite direction to its initial position by the return movement of the arm 31. The shaft 32 also supports a lever 34 comprising two arms, one of which extends above the shaft and the other of which extends below the shaft. Each of the arms of the lever 34 is provided with a pin 35 near its end. Normally the pin 35 on the upper arm is seated within a notch 36 formed in a link 37, the rear end of said link being pivotally connected to a lever 38. The upper arm of the lever 34 coöperates with the link 37 in adding operations, and the lower arm of the lever 34 coöperates with the link in clearing operations. The clearing mechanism is not claimed in this instance, and is not herein described, the construction and operation of this mechanism in the Dalton adding machine being well known. It is obvious that when the shaft 32 is rocked in the manner above described, the link 37 will be actuated first to a rearward position in which it will be retained during the entire forward turning movement of the shaft 30 and the arm 31. During the initial part of the rearward turning movement of the shaft 30 and the arm 31, the latter engages the arm 33 and turns the shaft 32 to its first or normal position, thus moving the link 37 and the lever 38 forwardly. The shaft 16 supports two levers 39 (Fig. 3), one of which is at each side of the series of racks 17—18. Both of the levers 39 are rigid with the rock shaft 16 and one of said levers has a depending portion 40 (shown in dotted outline in Fig. 1.) The depending portion 40 has a projection 41 extending into an appropriate slot in the lever 38, so that when the lever 38 is moved rearwardly, as above described, the depending portion 40 of the lever 39 will also be moved rearwardly, thus turning the shaft 16 and depressing the forward ends of both of the levers 39; and when the lever 38 is moved to its forward position as above described, the depending arm 40 of the lever 39 will be swung forwardly thus turning the shaft 16 and raising the forward ends of both of the levers 39. The forward ends of the levers 39 are of duplicate construction, each of said levers having a cam slot 42 near its forward end receiving pins 43 attached to the pivoted arms 27. From this construction it will be apparent that when the levers 39 are in their raised positions the adding pinions 29 will be held in engagement with the racks 18. The mechanism normally stands in this position and when the listing mechanism is operated the initial part of the forward movement of the arm 31 results in turning the shaft 32 in a direction to actuate the link 37 and the lever 38 to their rearward positions, thus turning the shaft 16 slightly and lowering or depressing the forward ends of the levers 39. Due to the construction of the cam slots 42 the depression of the forward ends of the levers 39 swings forwardly the frame supporting the adding pinions 29 and disengages the latter from the racks 18. This occurs prior to any forward movement of the type-carriers so that the type-carriers are permitted to make their entire forward movements without any corresponding movement by the adding pinions. The forward movement of the type-carriers also turns the racks 17 and their associated racks 18 forwardly on the shaft 16. The first portion of the return movement of the arm 31 results in turning the shaft 32 to its initial or starting point, thus moving the link 37 and the lever 38 to their forward positions. The forward movement of the lever 38 also turns the shaft 16 and raises the forward ends of the levers 39 so that, due to the construction of the cam slots 42, the adding pinion frame is swung rearwardly and the adding pinions 29 are placed in mesh with the corresponding racks 18. This occurs prior to any return movement by the type-carriers and before the rod 13 engages the type-carriers to restore them to their starting points; so that the entire return movement of the type-carriers is utilized to actuate the corresponding adding pinions in adding operations.

Each adding pinion 29 has a lug 44 on one side thereof which, in idle or cleared position of the adding pinion, contacts with the flat face of a shoulder 45 on the coöperating carrying pawl 25. When any carrying pinion has been set to represent "9" and is operated a farther distance to add another digit, the lug 44 contacts with the shoulder 45 and moves the carrying pawl 25 a distance sufficient to permit the projection 23 on the rack 18 in the next higher numerical order to enter the notch or space between the hook 26 and the arm of the carrying pawl. Under impulse of the spring 19 the said rack 18 in the next higher numerical order thus released is moved a sufficient distance to actuate the carrying pinions in engagement therewith to complete the process of carrying or transferring. A description of the manner and mechanism by which the carrying pawls are restored to their normal positions, in which the hooks 26 will serve as abutments for the projections 23, involves a description of the mechanism for effecting visibility of the totals represented in the adding pinions, and is hereinafter described.

A shaft 46 supported by the swinging adding pinion frame constitutes a support for the series of independently revoluble pinions 47 arranged in the same numerical orders with the pinions 29 and meshing therewith. Each pinion 47 has an annular rib or flange 48 extending from its leftward side. The flanges 48 extend completely around except for a gate or opening 49 at one side. Each carrying pawl 25 is provided with an arm 50 having a hook 51 engaging the rib or flange 48, so that the carrying pawl 25 is held positively in the position illustrated in Fig. 2 in which the hook 26 constitutes an abutment for the projection 23. The gate or opening 49 on each pinion 47 is arranged relative to the tripping lug 44 on the entrained adding pinion, so that when the tripping lug engages the shoulder 45 on the carrying pawl the gate or opening 49 is at the hook 51, thus permitting the hook to pass through said gate or opening as the carrying pawl is moved by the tripping lug 44. The arm 50 is resilient and is preferably thinner than the body of the carrying pawl 25 so that there will be ample clearance for the required extent of lateral movement by the arm 50 before it contacts with the adjacent pinion 47. The carrying pawls are guided between the prongs or teeth of a comb plate 52 supported by the frame of the machine. The teeth of the comb plate 52 at their rear extremities contact closely with the sides of the carrying pawls 25, but at their forward ends are farther apart, so that the forward edges of the carrying pawls may have a limited amount of lateral oscillation relative to their rear edges, it being understood that the connections of the carrying pawls with the shaft 24 also permit such oscillation. Each carrying pawl is yieldingly held or pressed toward its coöperating pinion 47 by special devices provided for that purpose which will now be described.

A bar 53 is supported by the framing of the machine and is provided with spaced notches in its upper edge. A slotted clip 54 is seated in each of the notches of the bar 53, said clips being arranged so that they extend between the arms 50 of the carrying pawls. A retractile spring 55 connects the lower end of each of said clips 54 with a forwardly extending arm on the lower end of the corresponding carrying pawl 25. In this way, the tension of the springs 55 will hold the upper ends of the clips in contact with the carrying pawls to the right of the clips, respectively, so that the hook 51 of each carrying pawl is thereby held in contact with the pinion 47 with which it coöperates.

A shaft 56 is supported by the arms 27 and constitutes a part of the adding pinion swinging frame. This shaft supports a series of independently revoluble pinions 57 meshing with the pinions 47 and arranged in the same numerical orders. Each of the pinions 57 is equipped with a dial 58. On the peripheries of the dials 58 the digits are represented so that when any item or total is represented in the adding pinions 29 such item or total will also be represented by the dials 58. The dials 58 are located between the key board and the platen. The case of the machine is formed with a sight slot 59 through which the numbers represented by the dials 58 may be observed. The adding pinions 29 are securely locked against rotation when out of engagement with the racks 18.

The device for locking the adding pinions includes a rod 60 supported by two arms 61. The arms 61 are pivoted in the adding pinion frame, one of said arms 61 being pivoted to each of the arms 27 upon pivots 62. A spring 63 connects each of the arms 61 with the frame of the machine and the tension of said springs is exerted to actuate the rod 60 toward the adding pinions 29. Each of the arms 61 has a slot 64 near its lower end receiving a pin 65 extending inwardly from the frame of the machine. The pins 64 limit movement of the arms 61 so that when the adding pinion frame is actuated to move the adding pinions 29 transversely of their axes into engagement with the racks 18, the said adding pinions will be moved out of locking engagement with the rod 60, due to the fact that movement of the arms 61 is stopped by the pins 65. This construction will be understood by reference to Fig. 2 in which it will be observed that when the pinions 29 are in engagement with the racks 18, they are out of engagement with the locking rod 60, and when the adding pinions are moved transversely of their axes out of engagement with the racks 18 they are moved into locking engagement with the rod 60. Thus, as a result of the locking of the adding pinions 29, the pinions 47 and 57 are also locked against rotation when the adding pinions are disengaged from their actuating racks.

As previously mentioned the carrying pawls 25 are moved rearwardly by the tripping lugs 44 operating against the shoulders 45 in transferring operations, as required to permit the pins 23 on the actuating racks 18 to enter the notches in the hooks 26. After the operation of transferring has been completed it is necessary to restore the carrying pawls to their forward positions in which the hooks 51 will be engaged with the ribs or flanges 48 on the pinions 47 and to place the hooks 26 in position to serve as abutments for the pins 23. The carrying pawls are restored to their normal positions by mechanism which will now be described.

Two arms 66 are rigidly attached to the shaft 24 and support a rod 67 at their upper ends. The rod 67 is rearward of the arms 50 which constitute a part of the carrying pawls, so that when the rod 67 is forced against said arms 50 the carrying pawls will be swung forwardly until the hooks 51 engage within the flanges 48, oscillation of the carrying pawls being permitted because of the widened slots in the comb plate 52 and the resiliency of the arms 50 themselves. An arm 68 is loosely mounted on the shaft 24 adjacent to one of the arms 66. A strong spring 69 has one end connected to the arm 68 and its other end connected to the adjacent arm 66. Another spring 70 also has one end attached to the arm 68, the other end of said spring 70 being connected to the comb plate 52. The arm 68 is formed with a notch 71 (Fig. 4) which receives a pin 72 on the adjacent arm 66. The spring 70 in connection with the arm 68 supports the same and, due to the connection formed by the pin 72 engaging in the notch 71, the arms 66 are yieldingly held in their rearward positions in which the ends of the rod 67 are against the rear walls of limit slots 73 formed in the frame plates of the machine. The slots 73 limit movement of the rod 67. The arm 68 has a cam surface 74 which is engaged by a roller-stud device 75 on the arm 31, when the latter is turned forwardly. This contact occurs near the end of the forward movement of the arm 31 and the arm 68 is thereby moved to lower or depress the forward end thereof to which the springs 69 and 70 are connected. Depression of the forward end of the arm 68 increases the tension of the strong spring 69 sufficiently to actuate forwardly the bail composed of the arms 66 and the cross rod 67. The cross rod 67 in its forward movement engages the rear edges of the arms 50 which are on the carrying pawls 25 and thereby forces the carrying pawls forwardly until the hooks 51 are engaged with the ribs or flanges 48, it being understood that at this time the projections 31 are below the hooks 26. It will be observed that the outer walls of the flanges 48 are inclined in order to permit the hooks 51 to move under pressure of the rod 67. In thus passing the flanges 48 the carrying pawls are moved in opposition to the pressure of the clips 54 under the tension of the springs 55, so that as soon as the hooks 51 have passed the inner edges of the flanges 48, the tension of the springs 55 will force the hooks toward the pinions 47 and into engagement with the inner edges of the flanges 48, thereby again locking the carrying pawls in non-carrying position.

What I claim and desire to secure by Letters Patent is:—

1. In an adding machine, a shaft, a series of racks pivoted on said shaft, a series of actuating racks meshing with said first-named racks, differential mechanism controlling the actuating racks, adding pinions, an additional series of racks for operating the adding pinions in adding and transferring operations, a connection between each of said first-named racks and one of said additional racks for operating the latter in adding operations, springs for actuating the additional racks in transferring operations, latches for stopping movement of said additional racks in one direction, locking pinions under control of the adding pinions engaging said latches respectively and holding said latches in position to stop movement of said additional racks in one direction as aforesaid, and means operated by the adding pinions for moving said latches to position to permit said additional racks to move in transferring operations.

2. In an adding machine, a shaft, a series of racks pivoted on said shaft, a series of actuating racks for differentially actuating said first-named racks, an additional series of racks pivoted on said shaft side by side with the first-named racks, a connection between each of said first-named racks and one of said additional racks for operating the latter in adding operations, latches for stopping movement of said additional racks in one direction, adding pinions operated by said additional racks in adding and transferring operations, and a series of locking pinions under control of the adding pinions engaging said latches respectively and holding said latches in position to stop movement of said additional racks in one direction as aforesaid.

3. In an adding machine, a shaft, a series of racks pivoted on said shaft, means for differentially operating said racks, an additional series of racks pivoted on said shaft side by side with the first-named racks, means for operating said additional racks by said first-named racks in adding operations, means for operating said additional racks in transferring operations independently of the first-named racks, latches for stopping movement of said additional racks in one direction and controlling transferring movement thereof, adding pinions operated by said additional racks, locking pinions operated by said adding pinions engaging and holding said latches in position to prevent transferring movement of said additional racks, and means operated by said adding pinions for disengaging said latches from said locking pinions, and moving said latches to position to permit transferring movement of said additional racks.

4. In an adding machine, a shaft, a series of racks pivoted on said shaft, means for differentially operating said racks, an additional series of racks pivoted on said shaft side by side with the first-named racks, means for operating said additional racks by said first-named racks in adding operations, means for operating said additional racks in transferring operations independently of the first-named racks, latches for stopping movement of said additional racks in one direction and controlling transferring movement thereof, adding pinions operated by said additional racks, locking pinions operated by said adding pinions engaging and holding said latches in position to prevent transferring movement of said additional racks, means operated by said adding pinions for disengaging said latches from said locking pinions, and moving said latches to position to permit transferring movement of said additional racks, an additional shaft, and a series of indicating dials mounted on said additional shaft and operated by said locking pinions to indicate the number or total represented in said adding pinions.

5. In an adding machine, a series of adding pinions, a series of racks for operating said adding pinions in adding and transferring operations, means for operating said racks in adding operations, actuators for moving said racks in transferring operations, series of latches for stopping movement of said racks in one direction and preventing transferring movement of said racks until the proper time to transfer from the lower to higher orders, a series of locking pinions operated by said adding pinions engaging and holding said latches in position to stop movement of said racks and prevent transferring movement of said racks, means operated by said adding pinions for releasing said latches from said locking pinions and moving said latches to position to permit transferring movement of said racks, and means for effecting locking engagement between said latches and said locking pinions after the operation of transferring has been completed in the process of addition.

6. In an adding machine, a series of adding pinions, a series of racks for operating said adding pinions in adding and transferring operations, a series of latches for stopping movement of said racks in one direction and preventing transferring movement of said racks until the proper time to transfer from lower to higher orders, a series of indicating dials for indicating the number or total represented in said adding pinions, a series of locking pinions driven by said adding pinions for operating said dials, and means in connection with said locking pinions for locking said latches in position to stop movement of said racks in one direction and prevent transferring movement of said racks until the proper time to transfer from lower to higher orders.

7. In an adding machine, a series of adding pinions, a series of dials for indicating visually the number or total represented in said adding pinions, pinions entraining said adding pinions with said dials for operating the latter by the former, racks for operating said adding pinions in adding and transferring operations, latches for stopping movement of said racks in one direction and preventing transferring movement of said racks until the proper time to transfer from lower to higher orders, locking connection between said latches and said entraining pinions holding said latches in position to prevent transferring movement of said racks, and means operated by said adding pinions for releasing said latches from said entraining pinions and moving said latches to position to permit said racks to move in transferring operations.

8. In an adding machine, a series of adding pinions, a series of dials for indicating visually the number or total represented in said adding pinions, pinions entraining said adding pinions with said dials for operating the latter by the former, racks for operating said adding pinions in adding and transferring operations, latches for stopping movement of said racks in one direction and preventing transferring movement of said racks until the proper time to transfer from lower to higher orders, locking connection between said latches and said entraining pinions holding said latches in position to prevent transferring movement of said racks, means operated by said adding pinions for releasing said latches from said entraining pinions and moving said latches to position to permit said racks to move in transferring operations, and means for restoring the connection between said latches and said entraining pinions when the operation of transferring is completed.

9. In an adding machine, a series of adding pinions, a shaft on which said pinions are mounted, a series of dials for indicating visually the number or total represented in said adding pinions, a shaft separate from the adding pinion shaft supporting said dials, a shaft intermediate the dial shaft and adding pinion shaft, a series of pinions on said intermediate shaft entraining the adding pinions with said dials and operating the latter by the former, racks for operating the adding pinions in adding and transferring operations, mechanism for operating said racks, latches for stopping movement of said racks in one direction and preventing transferring movement of said racks until the proper time to transfer from lower to higher orders, connections between said latches and said entraining pinions locking said latches in position to prevent transferring movement of said racks, and means operated by said adding pinions for releasing said latches from said entraining pinions and moving said latches to position to permit said racks to move in transferring operations.

10. In an adding machine, a shaft, a series of adding pinions on said shaft, an additional shaft, a series of dials on the additional shaft for indicating the number or total represented in the adding pinions, an intermediate shaft, a series of pinions on the intermediate shaft entraining the adding pinion with said dials, whereby the dials will be operated by the adding pinions, a series of racks for operating the adding pinions in adding and transferring operations, latches for stopping movement of said racks in one direction and preventing transferring movement of said racks until the proper time to transfer from lower to higher orders, connections locking said latches with said entraining pinions for holding said latches in position to prevent transferring movement of said racks, means operated by the adding pinions for releasing said latches from said entraining pinions and moving said latches to position to permit transferring movement of said racks, and means for restoring connection between said latches and said entraining pinions after the transferring operation has been completed.

11. In an adding machine, a shaft, a series of racks pivoted on said shaft, an additional series of racks pivoted on said shaft and operated by the first-named racks in adding operations, means for operating the additional racks in transferring operations, adding pinions operated by the additional racks in adding and transferring operations, latches limiting movement of said additional racks in one direction, locking pinions operated by the adding pinions and normally holding said latches in position to latch said additional racks, and means operated by the adding pinions for releasing said latches from said locking pinions and moving them to position to permit said additional racks to operate in transferring operations.

12. In an adding machine, a shaft, a series of racks pivoted on said shaft, an additional series of racks pivoted on said shaft and operated by the first-named racks in adding operations, independent means for operating said additional racks in transferring operations, adding pinions operated by said additional racks in adding and transferring operations, latches limiting movement of said additional racks in one direction, locking pinions controlled by said adding pinions holding said latches normally in position to prevent transferring movements of said additional racks, means operated by said adding pinions for releasing said latches from said locking pinions and moving them to position to permit said additional racks to operate in transferring operations, and means for reëngaging said latches with said locking pinions.

13. In an adding machine, a shaft, a series of racks pivoted on said shaft, an additional series of racks pivoted on said shaft operated by the first-named racks in adding operations, independent means for operating said additional racks in transferring operations, adding pinions operated by said additional racks in adding and transferring operations, latches for limiting movement of said additional racks in one direction, locking pinions holding said latches normally in position to limit movement of said additional racks, means operated by the adding pinions for releasing said latches from said locking pinions and moving said latches to position to permit said additional racks to operate in transferring operations, and indicating devices operated by said locking pinions for indicating the amounts represented by the adding pinions.

14. In an adding machine, a shaft, a series of racks pivoted on said shaft, mechanism for operating said racks in adding and in transferring operations, a series of adding pinions operated by said racks in adding and in transferring operations, a series of indicating devices, a series of entraining pinions intermediate the adding pinions and the indicating devices for actuating said indicating devices by said adding pinions to indicate the amounts represented by said adding pinions, latches for limiting movement of said racks in one direction, means controlled by said entraining pinions for holding said latches in position to limit movement of said racks in one direction, and means operated by the adding pinions for releasing said latches from said entraining pinions and moving said latches to position to permit said racks to operate in transferring operations.

15. In an adding machine, a shaft, a series of racks pivoted on said shaft, adding pinions, means for operating said adding pinions by said racks, latches limiting movement of said racks in one direction, locking pinions for holding said latches in latching position, means operated by said adding pinions for releasing said latches from the locking pinions, and indicating devices operated by said locking pinions for indicating the amount represented by the positions of said adding pinions.

16. In an adding machine, a series of adding pinions, racks for operating said adding pinions in adding and in transferring operations, latches for limiting movement of said racks in either adding or transferring operations, locking pinions engaging and holding said latches in position to prevent transferring movement of said racks until it is necessary to transfer in the process of addition, means operated by the adding pinions for releasing said latches from said locking pinions when it is necessary to transfer from lower to higher orders in the process of addition, and means operated by the adding pinions for indicating the amounts represented by the positions of the adding pinions.

17. In an adding machine, a series of adding pinions, a series of racks for operating said pinions in adding and transferring operations, a series of locking pinions controlled by the adding pinions, latches engaging said locking pinions, means in connection with said latches for limiting movement of said racks in one direction, means operated by the adding pinions for moving said latches to enable said racks to operate in transferring operations, means for moving said adding pinions into and out of mesh with said racks, and a locking bail arranged to engage said adding pinions to prevent rotation thereof when they are out of engagement with said racks.

18. In an adding machine, a shaft, a series of racks mounted on said shaft, means for operating said racks, an additional series of racks mounted on said shaft and being movable relative to the first-named racks in transferring operations, springs for actuating the additional series of racks in transferring operations, means limiting extent of movement of said additional racks relative to the first-named racks, adding pinions movable into and out of engagement with the additional racks, means for moving said adding pinions out of engagement with said additional racks prior to movement of said racks in one direction and engaging said adding pinions with said additional racks prior to movement thereof in the opposite direction, elements coöperating with said adding pinions and said additional racks and controlling transferring operations thereof, and means operated by said adding pinions for indicating the amounts represented by the positions of said pinions.

19. In an adding machine, a shaft, a series of racks mounted on said shaft, recording mechanism for operating said racks, an additional series of racks mounted on said shaft and being movable relative to said first-named racks, springs for moving said additional racks in one direction relative to said first-named racks in transferring operations, means for operating said additional racks by the first-named racks, adding pinions operated by said additional racks in adding and transferring operations, locking pinions operated by said adding pinions, latches having interlocking connection with said locking pinions for limiting movement of said additional racks in one direction and preventing movement of said additional racks in transferring operations, and means operated by the adding pinions for releasing said latches from said locking pinions and moving said latches to position to permit transferring movement of said additional racks.

20. In an adding machine, a shaft, a series of racks pivoted on said shaft, mechanism for operating said racks, an additional series of racks pivoted on said shaft and being movable relative to the first-named racks in transferring operations, means for moving said additional racks by said first-named racks in adding operations, means for moving said additional racks independently of and relative to said first-named racks in transferring operations, a series of adding pinions movable into and out of engagement with said additional racks, means for locking said adding pinions against rotation when out of engagement with said racks, latches limiting extent of movement of said additional racks in one direction, locking pinions operated by said adding pinions and having interlocking connection with said latches whereby said latches are held in position to prevent transferring movement of said additional racks, means operated by said adding pinions for releasing said latches from said locking pinions and moving said latches to position to permit transferring movement of said additional racks, and means for restoring the locking connection between said latches and said locking pinions when the transferring operation is completed.

21. In an adding machine, a shaft, a series of racks pivoted on said shaft, an additional series of racks pivoted on said shaft, means for operating said additional racks by said first-named racks in adding operations, means for operating said additional racks independently of said first-named racks in transferring operations, adding pinions operated by said additional racks, locking pinions operated by said adding pinions, indicating devices operated by said locking pinions for indicating the amount represented by said adding pinions. latches controlled by said locking pinions for limiting extent of movement of said additional racks in adding and transferring operations, means for moving said adding pinions into and out of engagement with said additional racks, and means for preventing rotation of said adding pinions when out of engagement with said racks.

22. In an adding machine of the Dalton type, differential mechanism, keys arranged in a key board operable to introduce numbers into the differential mechanism, a platen, type controlled by the differential mechanism to print upon said platen the numbers introduced into the differential mechanism, said numbers being visible after being printed and after the type have been withdrawn to normal position, a swinging frame, a shaft in said frame, adding pinions on said shaft necessarily substantially hidden from view in the machine, a second shaft carried by said swinging frame, a series of indicators on said second shaft for indicating visually the total represented in the adding pinions, pinions side by side with said indicators, intermediate pinions carried by said swinging frame in permanent operative engagement with said adding pinions and said indicator pinions, whereby said indicators will be operated concurrently with the adding pinions and the sum of numbers that have been added will be visibly displayed at a line intermediate the key board and the printing line on the platen, and transfer controlling devices controlled by said intermediate pinions.

23. In an adding machine of the Dalton type, differential mechanism, keys arranged in a key board operable to introduce numbers into the differential mechanism, arcuate type-carriers controlled by the differential mechanism, a platen located within the arcs of said type-carriers, type controlled by said carriers having their printing ends toward the platen and being operable to print upon the platen the numbers introduced into the differential mechanism, said numbers being visible after being printed and after the type-carriers have been withdrawn to normal position, a swinging frame, a shaft carried by said frame, adding pinions on said shaft necessarily substantially hidden from view in the machine for adding the numbers printed, an additional shaft carried by said swinging frame, a series of visible indicators on said additional shaft, pinions on said additional shaft and in connection with said indicators, a third shaft carried by said swinging frame, a series of intermediate pinions on said third shaft for operating said indicator pinions, whereby said indicators will be operated concurrently with the adding pinions and the sum of numbers that have been added will be visibly displayed at a point intermediate the keyboard and the printing line on the platen when the operating shaft of the machine is in idle position, and transfer controlling devices controlled by said intermediate pinions.

24. In an adding machine, a shaft, type-carriers pivoted thereon, type carried by said type-carriers, a platen within the arcs of the type-carriers for receiving the records from said type, a second shaft, a series of racks pivoted on said second shaft, a series of additional racks also pivoted on said second shaft and being movable relatively thereto in transferring operations, a third shaft, adding pinions on said third shaft operated by said additional racks in adding and transferring operations, a fourth shaft, indicating devices mounted on the fourth shaft, and means for operating the indicating devices by the adding pinions, whereby the sum of numbers that have been added will be visibly displayed.

25. In an adding machine, a shaft, arcuate type-carriers mounted thereon, type carried by said type-carriers, a platen within the sector arcs for receiving the records from said type, a second shaft, a series of racks pivoted on said second shaft, a series of additional racks also pivoted on said second shaft under control of the first-named racks and being movable relatively thereto in transferring operations, means limiting the extent of relative movement of said two series of racks, a third shaft, adding pinions on said third shaft operated by said additional series of racks in adding and transferring operations, a fourth shaft, indicating devices on said fourth shaft, a shaft intermediate the third and fourth shafts, and pinions on the intermediate shaft for operating the indicating devices from said adding pinions.

26. In an adding and listing machine of the Dalton type, keys arranged in a key board, differential mechanism, means for introducing numbers into the differential mechanism by operation of the keys, a platen, printing mechanism controlled by the differential mechanism for recording on the platen, a swinging frame, a shaft in said frame, adding pinions on said shaft movable into and out of position to be operated by the printing mechanism and necessarily substantially hidden from view in the machine, a second shaft in said swinging frame, a series of visible indicating devices on said second shaft intermediate the key board and the platen, pinions on said second shaft in connection with said indicating devices, a series of intermediate pinions supported by said frame meshing with the adding pinions and with said second-named pinions for operating said indicating devices concurrently with the adding pinions to indicate the sum of numbers that have been added, and transfer controlling devices controlled by said intermediate pinions.

27. In an adding machine, racks, adding pinions movable into and out of engagement with the racks, projections on the racks and the pinions, latches coöperating with said projections in adding, transferring and clearing operations, locking pinions operated by the adding pinions and normally locking said latches in position to prevent transferring movement of said racks, said latches being released from said locking pinions by contact therewith of the projections on the adding pinions, and indicating devices operated by the locking pinions for indicating the sum of the numbers represented in the adding pinions.

28. In an adding and listing machine, a shaft, a series of racks mounted thereon, a second series of racks mounted on the same shaft and coöperating with the racks of the first-mentioned series in adding and transferring operations, a second shaft located above the first-named shaft, a series of type-carriers mounted on said second shaft, each thereof being operatively connected with a corresponding rack of the series first mentioned and holding it and its corresponding rack of the second mentioned series securely in their bearings on said shaft on which they are mounted.

29. In an adding and listing machine, a shaft, a series of racks mounted thereon, a second series of racks mounted on the same shaft and controlled by the racks of the first-mentioned series in a part of their movements, a series of adding pinions actuated by the second series of racks in adding and transferring operations, means for operating said second series of racks independently of the first series to operate said adding pinions in transferring operations, and means for disengaging said adding pinions from said second series of racks to enable said racks to move in one direction while the adding pinions remain stationary.

30. In an adding and listing machine, a shaft, a series of racks mounted thereon, a second series of racks mounted on the same shaft and coöperating with the racks of the first-mentioned series in adding and transferring operations, a series of adding pinions operated by the second series of racks in adding and transferring operations, means for operating said second series of racks by the first-named series to operate said adding pinions in adding operations, means for operating the second series of racks independently of the first series to operate the adding pinions in transferring operations, pivoted elements for moving said adding pinions into and out of engagement with the second series of racks, means for actuating said elements to disengage said pinions from said racks to enable said racks to move in one direction while said pinions remain stationary, and means for operating said elements to engage said wheels with said racks prior to the movement of said racks in the opposite direction, whereby said racks will operate said pinions in adding and transferring operations.

31. In an adding machine, a shaft, a series of racks mounted thereon, a second series of racks mounted on the same shaft and controlled by the first-named series in adding and transferring operations, adding mechanism operated by said second series of racks, indicating devices under control of said adding mechanism for indicating the sum represented in said adding mechanism, a second shaft parallel with the first-named shaft, a series of racks mounted on said second shaft, and engaging the racks of the first-named series respectively, and recording type supported by the racks which are mounted on said second shaft.

32. In an adding and listing machine, adding pinions, a shaft, a series of racks mounted thereon, a second series of racks mounted on the same shaft for operating said adding pinions in adding and transferring operations, means for operating said second series of racks by the first series in adding operations, adding mechanism operated by said second series of racks, latches controlled by said adding mechanism for controlling movement of said second series of racks in transferring operations, a second shaft parallel with the first-named shaft, a series of type-carriers mounted on said second shaft and being operatively connected with the racks of the first-named series respectively, and recording type mounted on said type-carriers.

33. In an adding and listing machine, a series of adding pinions, a shaft, a series of racks mounted on said shaft, a second series of racks mounted on the same shaft for operating said adding pinions in adding and transferring operations, means for operating said second series of racks by the first series in adding operations, means for operating the second series of racks independently of the first series in transferring operations, a second shaft parallel with the first-named shaft, a series of type-carriers pivotally supported by the second shaft and operatively engaging the first series of racks, differential mechanism limiting movement of said type-carriers in one direction, whereby both series of racks are differentially positioned for adding operations, and recording type carried by said type-carriers.

34. In an adding and listing machine, adding pinions, a shaft, a series of racks mounted thereon, a second series of racks mounted on the same shaft for operating the adding pinions in adding and transferring operations, means for operating the second series of racks by the first series in adding operations, means for holding said adding pinions out of engagement with the second series of racks during movement of said racks in one direction and holding said adding pinions in engagement with said racks during movement of said racks toward their starting points, means for operating said second series of racks independently of the first series in transferring operations, a second shaft parallel with the first-named shaft, a series of type-carriers mounted on said second-named shaft and being operatively connected with the racks of the first-named series respectively, differential mechanism for limiting movement of said type-carriers in one direction, and recording type mounted on said type-carriers.

BIRNEY DYSART.

Copies of this patent may be obtained for five cents each, by addressing the "Commissioner of Patents, Washington, D. C."